(12) United States Patent
Wiege

(10) Patent No.: US 12,085,129 B2
(45) Date of Patent: Sep. 10, 2024

(54) FRICTION CLUTCH WITH A COVER MADE FROM SHEET METAL WITH FOLDED ANTI-FRICTION BEARING SEATS, TRANSMISSION ARRANGEMENT AND PRODUCTION METHOD

(71) Applicant: Schaeffler Technologies AG & Co. KG, Herzogenaurach (DE)

(72) Inventor: Viktor Wiege, Bühl (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 90 days.

(21) Appl. No.: 17/915,503

(22) PCT Filed: Feb. 22, 2021

(86) PCT No.: PCT/DE2021/100170
§ 371 (c)(1),
(2) Date: Sep. 29, 2022

(87) PCT Pub. No.: WO2021/197532
PCT Pub. Date: Oct. 7, 2021

(65) Prior Publication Data
US 2023/0341005 A1   Oct. 26, 2023

(30) Foreign Application Priority Data
Mar. 31, 2020   (DE) .................. 10 2020 108 818.3

(51) Int. Cl.
F16D 13/58 (2006.01)
F16C 35/06 (2006.01)
F16D 13/46 (2006.01)

(52) U.S. Cl.
CPC .............. *F16D 13/58* (2013.01); *F16C 35/06* (2013.01); *F16C 2361/43* (2013.01); *F16D 13/46* (2013.01); *F16D 2250/0023* (2013.01); *F16D 2250/003* (2013.01); *F16D 2300/26* (2013.01)

(58) Field of Classification Search
CPC ...... F16D 2300/26; F16D 13/38–13/58; F16D 2250/0023; F16D 2250/003; F16C 35/06; F16C 35/063; F16C 35/067; F16C 2361/43
See application file for complete search history.

(56) References Cited

U.S. PATENT DOCUMENTS

2009/0283380 A1   11/2009   Kimmig

FOREIGN PATENT DOCUMENTS

| CN | 101542152 A | 9/2009 |
|---|---|---|
| CN | 102099592 A | 6/2011 |
| CN | 105370723 A | 3/2016 |
| CN | 106133359 A | 11/2016 |
| CN | 110388389 A | 10/2019 |
| DE | 7217030 U | 10/1973 |

(Continued)

*Primary Examiner* — Richard M Lorence

(57) ABSTRACT

A friction clutch for a drive train of a motor vehicle includes a cover. The cover is a deep drawn sheet metal component having a contour with folds. The folds form an inner bearing seat for receiving an inner anti-friction bearing for mounting a shaft or an outer bearing seat for receiving an outer anti-friction bearing for mounting the friction clutch in a transmission housing. The folds may include radial folds. The contour may be sinusoidal in a circumferential direction.

15 Claims, 4 Drawing Sheets

(56) References Cited

FOREIGN PATENT DOCUMENTS

| DE | 7832849 U1 | 3/1979 | | |
|---|---|---|---|---|
| DE | 2846555 A1 | 5/1980 | | |
| DE | 3936871 A1 | 5/1990 | | |
| DE | 4129513 A1 | 3/1993 | | |
| DE | 10236806 A1 | 1/2004 | | |
| DE | 102006049352 B3 | 7/2008 | | |
| DE | 602006000539 T2 * | 11/2008 | ............ | F16D 13/58 |
| DE | 102009042823 A1 | 4/2010 | | |
| DE | 102008043290 A1 | 5/2010 | | |
| DE | 102009056350 A1 | 6/2011 | | |
| DE | 102011012896 A1 | 12/2011 | | |
| DE | 102017126999 A1 | 5/2019 | | |
| DE | 102017127917 A1 | 5/2019 | | |
| DE | 102017130828 A1 | 6/2019 | | |
| DE | 102019109387 A1 | 10/2019 | | |
| EP | 1681481 A1 | 7/2006 | | |
| GB | 1588081 A | 4/1981 | | |
| GB | 2348264 A | 9/2000 | | |

* cited by examiner

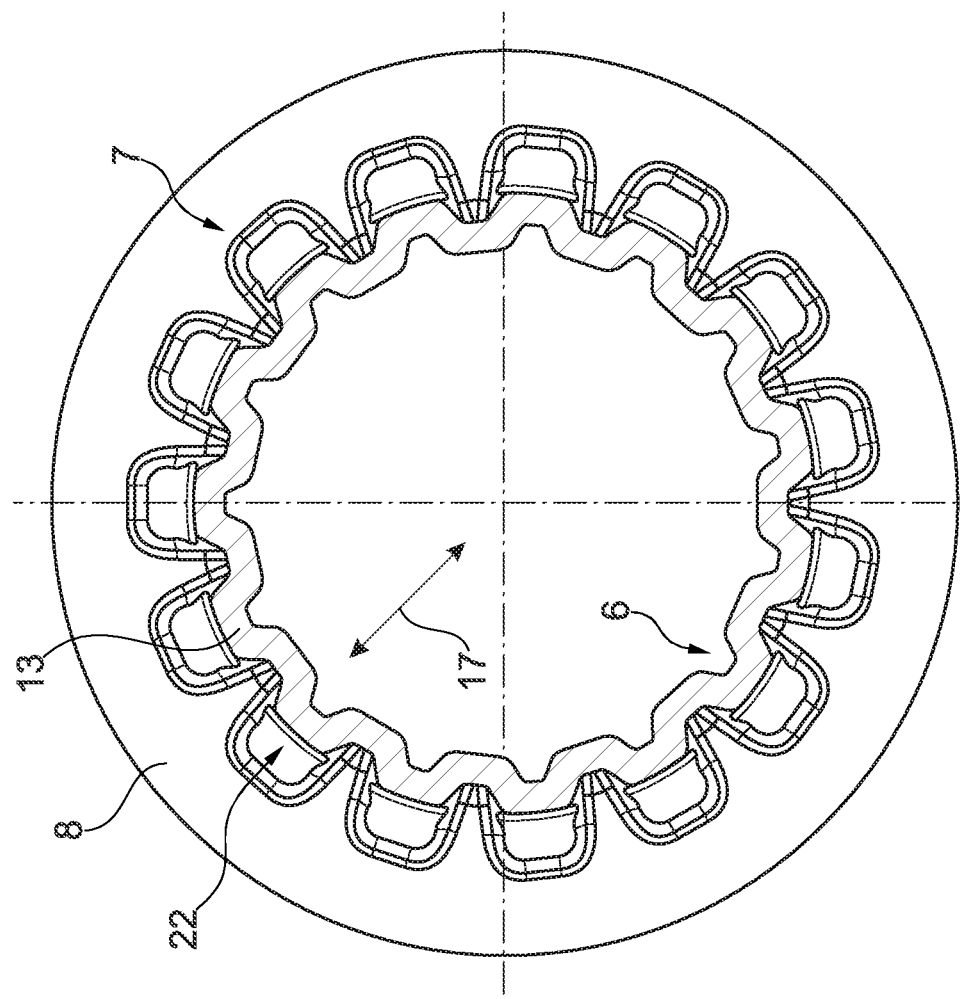
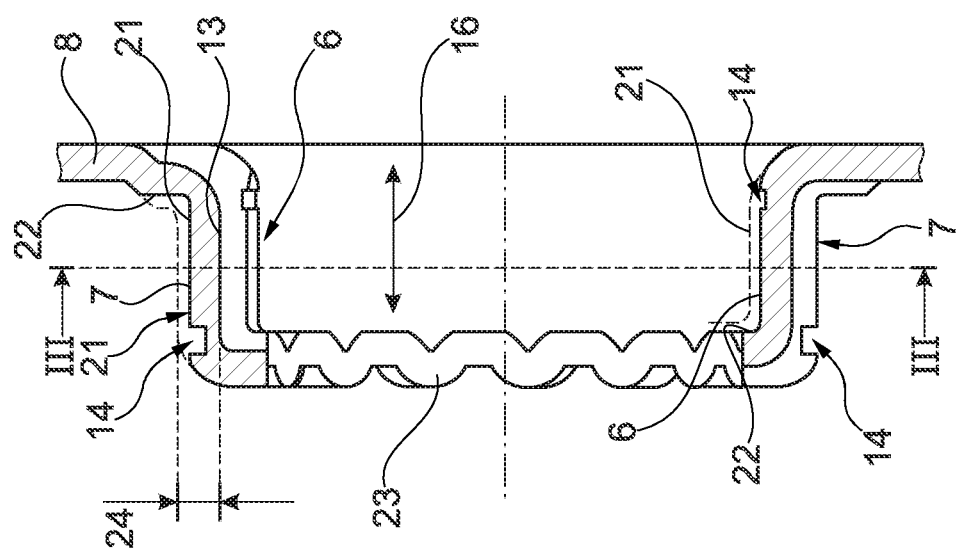

FRICTION CLUTCH WITH A COVER MADE FROM SHEET METAL WITH FOLDED ANTI-FRICTION BEARING SEATS, TRANSMISSION ARRANGEMENT AND PRODUCTION METHOD

CROSS-REFERENCE TO RELATED APPLICATIONS

This application is the United States National Phase of PCT Appln. No. PCT/DE2021/100170 filed Feb. 22, 2021, which claims priority to German Application No. DE102020108818.3 filed Mar. 31, 2020, the entire disclosures of which are incorporated by reference herein.

TECHNICAL FIELD

The present disclosure relates to a friction clutch for a drive train of a motor vehicle, with a cover which, in order to be mounted in a transmission housing and/or in order to mount a shaft, has an inner bearing seat and/or an outer bearing seat for respective receiving of an anti-friction bearing, wherein the cover is a (deep-drawn) sheet metal component.

BACKGROUND

There are already numerous friction clutches known from the prior art, including those that are used in hybrid vehicles. Thus, for example, DE 10 2017 127 917 A1 also discloses a clutch arrangement for a vehicle. This clutch arrangement includes a friction clutch, which is arranged between a drive shaft and a transmission input shaft for the transmission of torque. It also includes a transmission input shaft and a release bearing, the friction clutch having a counterplate, a pressure plate that can be displaced in an axial direction by the release bearing to open and close the friction clutch, and a clutch disk arranged between the counterplate and the pressure plate. Starting from a main bearing carrying the transmission input shaft, the transmission input shaft extends through the release bearing, the pressure plate and the clutch disk to a first end, the first end being mounted in the counterplate via a pilot bearing. In a clutch arrangement, the first end of the transmission input shaft is surrounded by a compensating element, which is in an operative connection with the pilot bearing when the friction clutch tilts relative to the transmission input shaft.

Friction clutches are often used as rotor carriers in electric machines for hybrid modules in a motor vehicle.

Covers for clutch pressure plates and double clutches formed from one piece of sheet steel are known from applications in the motor vehicle sector, these having a bearing seat arranged coaxially to the axis of rotation of the clutch. The bearing seat can be provided for both the outer ring and the inner ring of an anti-friction bearing. The bearing seat can be equipped with a shoulder for axially supporting the anti-friction bearing. The bearing seat can be provided with one or more grooves for mounting the securing rings. The bearing seats are usually machined after the cover has been formed. In some cases, it is necessary to provide the cover with two bearing seats, namely for an inner ring of the anti-friction bearing for mounting, for example in a gear housing, and for an outer ring of the anti-friction bearing for storage, for example a shaft. The bearing seats must be arranged radially one above the other or with only a small axial offset in order to be able to make the entire construction compact in the axial direction. The two diameters of the outer and inner ring of the selected anti-friction bearing usually differ in such a way that either the cover has to be made from at least two components connected to one another, or the sheet metal thickness for the other areas apart from the bearing seats is unnecessarily large.

SUMMARY

The present disclosure provides a solution which, despite the given difference between the outer and inner rings of inner and outer anti-friction bearings with a small sheet metal thickness, shows ways of manufacturing the cover from one piece. Furthermore, the disclosure enables the shoulder and the grooves for the assembly of the securing rings to be made despite the axial offset between the outer and the inner anti-friction bearing.

According to the disclosure, in the case of a generic friction clutch, there is a contour which has folds in the region of at least one of the bearing seats/of the bearing seat.

In other words, the disclosure provides for folding the sheet metal between the future two bearing seats in the radial direction after/during forming of the cover so that the material for later machining remains present partly for the first and partly for the second bearing seat. The proportion of material for both bearing seats can be distributed as desired.

The sheet metal when forming the cover between the future two bearing seats should be folded/creased/bent in the axial direction in such a way that the material for later machining of the shoulder and groove to accommodate the securing rings of both bearing seats remains present partly for the first and partly for the second bearing seat. The proportion of material for both bearing seats can be distributed as desired and required.

There may be radial folds in the bearing seat. The friction clutch can then include a cover which is made from a piece of sheet steel. It is then possible to insert an anti-friction bearing into the bearing seat to support an input shaft. Furthermore, a groove can be introduced in order to mount a securing ring. The clutch can then be provided with the anti-friction bearing during assembly, which is installed, for example, in a transmission housing of a motor vehicle. The clutch cover is inserted with the bearing seat into an inner ring of an anti-friction bearing and secured against axial displacement by means of a securing ring mounted on a groove.

The contour in the region of the at least one bearing seat or the two bearing seats may run sinusoidally in the circumferential direction. The cover can then be manufactured in such a way that the material for later machining of the bearing seats was obtained by folding in the radial direction/folding over in the radial direction. The material distribution between the two bearing seats can be selected as required.

Production is facilitated if the radial folds are selected to be so thick and lie so close together that enough/sufficient residual material remains for machining the bearing seat after the removal of the planned removal material to provide a desired stability. A virtual material thickness is thus maintained, which is then reduced, for example by machining, for the final state. The cover is therefore manufactured in such a way that the material is sufficiently large so that the shoulders for the anti-friction bearing rings and the grooves for the assembly of securing rings remain when machining is carried out. Thus, folding in the axial direction is employed. These folds in the axial direction thus assist in machining the shoulder and the grooves for the securing rings. Here, too, the material distribution between the shoulder and the groove with regard to the inner bearing seat and/or the outer bearing seat must be selected in accordance with the requirements.

A groove, extending over the circumference, for example, for receiving a securing ring may be introduced into the folds. Securing against axial slipping can then be achieved with inexpensive means. The assembly also remains simple.

If the contour with folds is machined on its inside and outside to form a bearing seat, then a sufficient surface quality can also be provided.

In an example embodiment, the cover has axial folds on a surface that is oriented perpendicular to the axis of rotation of the cover, for example an end face, e.g., on one end.

A groove for a securing ring assigned to an inner bearing may be further away from the region with axial folds than a groove for a locking ring assigned to an outer bearing.

The disclosure also relates to a transmission arrangement with a transmission housing, in which the friction clutch according to the disclosure is inserted in a manner which is supported via an anti-friction bearing, and an input shaft is mounted via a further anti-friction bearing in the cover of the friction clutch.

The disclosure also relates to a method for manufacturing the friction clutch that is central to the disclosure, wherein the bearing seat or the bearing seats are folded (e.g. radially).

The disclosure provides a clutch cover whose bearing seat(s) is/are obtained by radial folding of the metal sheet. Shoulders are obtained by axial folding. Machining can then be provided.

BRIEF DESCRIPTION OF THE DRAWINGS

The present disclosure is further explained below with the aid of drawings. An example embodiment is shown. In the figures:

FIG. 2 shows an enlarged longitudinal section through the cover of the friction clutch from FIG. 1, shown in isolation, FIG. 3 shows a cross-sectional illustration along the line III from FIG. 2 through the cover of the friction clutch according to the disclosure.

DETAILED DESCRIPTION

The figures are only schematic in nature and serve only for comprehension of the disclosure. The same elements are provided with the same reference signs.

Figure 1:
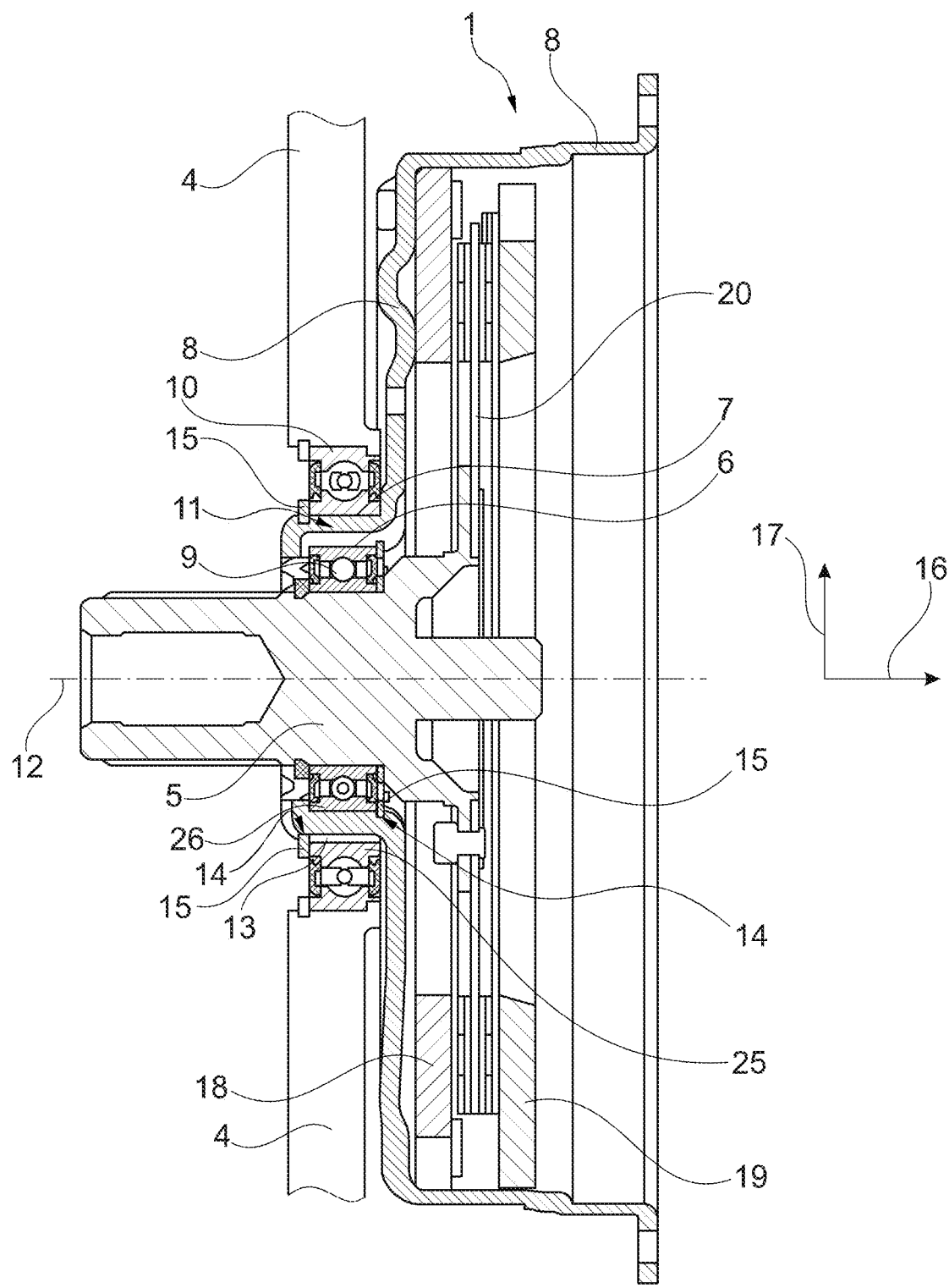
FIG. 1 shows a longitudinal section through a friction clutch according to the disclosure, in which not all components that are valuable for the friction clutch are shown.

FIG. 1 shows a first exemplary embodiment of a friction clutch 1 according to the disclosure. The friction clutch 1 is intended to be installed in a drive train 2 of a motor vehicle 3, for which reason reference is made to FIG. 5.

Returning to FIG. 1, it should be explained that the friction clutch 1 is inserted in a transmission housing 4 so that it can rotate. Inside the friction clutch 1, a shaft 5 such as an input shaft is rotatably inserted. For this double mounting, there is an inner bearing seat 6 and an outer bearing seat 7 on a cover 8 of the friction clutch 1. There are bearings provided there.

The cover 8 is a sheet metal component, in particular a deep-drawn component. The inner bearing seat 6 is provided for accommodating an inner anti-friction bearing 9, whereas the outer bearing seat 7 is provided for accommodating an outer anti-friction bearing 10. More precisely, an inner (bearing) ring 25 of the outer anti-friction bearing 10 sits on the outer bearing seat 7, whereas an outer (bearing) ring 26 of the inner anti-friction bearing 9 sits on the inner bearing seat 6.

In the region of the inner bearing seat 6 and the outer bearing seat 7, a contour with folds 11 is formed. In the region of this contour 11, which runs around an axis of rotation 12, radial folds 13 are present. These radial folds 13 of the cover 8 can also be seen clearly in FIGS. 3 and 4. However, it is noticeable that due to the waviness of the folds 13, the bearing seat 6 is not located above the axis of rotation 12 in the longitudinal section plane.

Both in the region of the inner bearing seat 6 and in the region of the outer bearing seat 7 there is a groove 14 for receiving a securing ring 15. The axis of rotation 12 specifies the axial direction 16, with a radial direction 17 running perpendicular thereto. It is valuable for the principle of the friction clutch 1 if a counterplate 18 is used, which clamps a clutch disc 20 together with a pressure plate 19 in the force-transmitting/torque-transmitting state.

The presence of the radial folds 13 in the region of the inner bearing seat 6 and the outer bearing seat 7 is visualized in FIG. 2. The material 21 removed during machining is indicated by dashed lines. In the case of such a machining operation, shoulders 22 are then also machined for axial contact with the anti-friction bearings 9 and 10, which are not shown in FIG. 2. Centrally between the bearing seats 6 and 7 there is an area with axial folds 23. The inner bearing seat 6 is finally worked out by means of machining on the outside. A sheet metal thickness set after non-cutting forming and before milling is referenced with the reference number 24.

Figure 4:
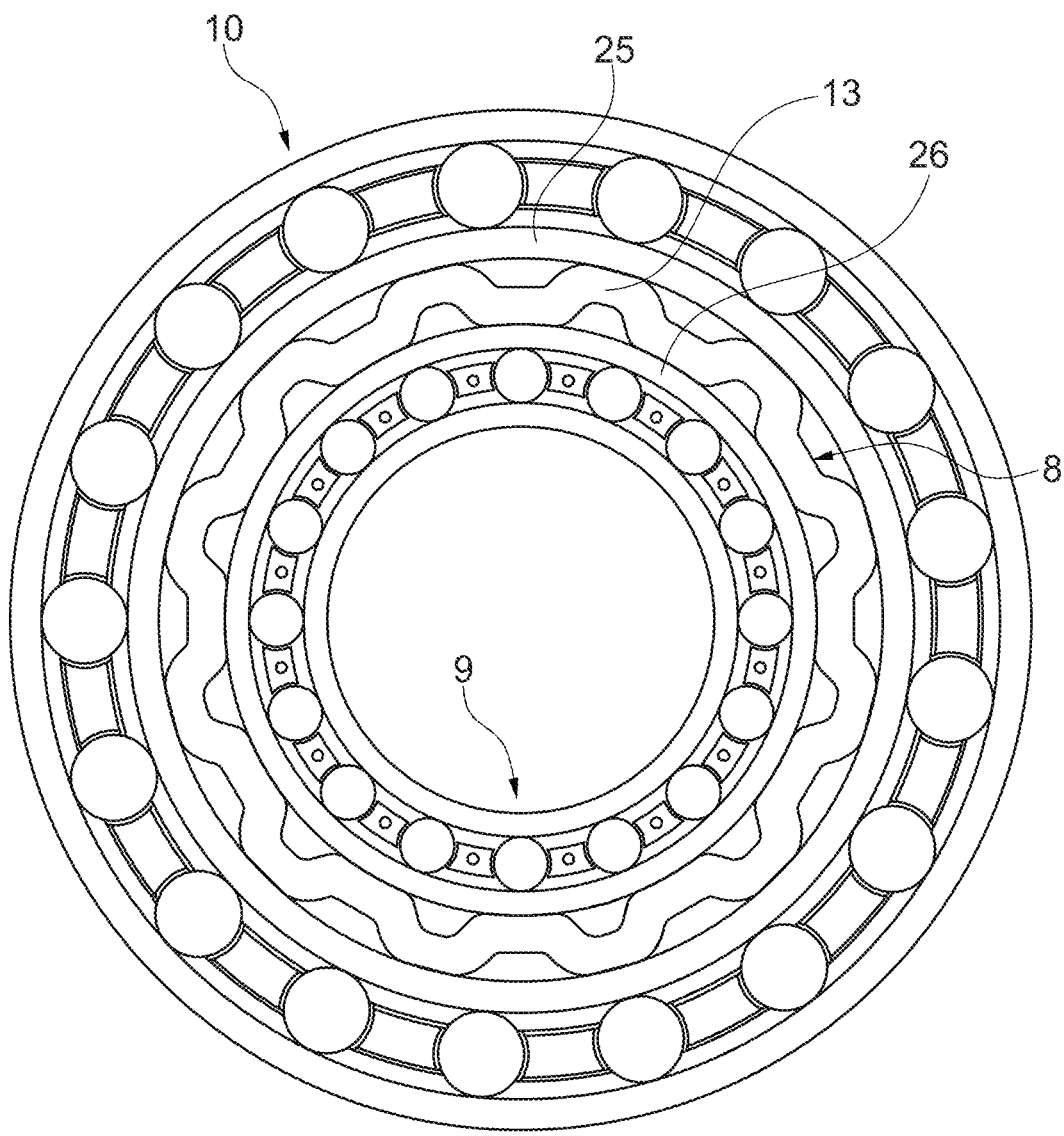
FIG. 4 shows a cross section through the cover of the friction clutch from FIG. 1 with anti-friction bearings which are assigned to an inner bearing seat and an outer bearing seat.

The radial folds 13 are selected to be so thick and lie so close together that for machining of the bearing seat 6 and/or 7 when the planned removal material 21 is removed there remains enough/sufficient residual material for a given/desired stability. The thickness is measured in the radial direction. Before machining, an initial thickness/virtual thickness (shown in dashed lines in FIG. 2) is greater than after machining. The processed state is shown in FIG. 4. The region of the bearing seat is thus artificially thickened by the folding. It is thickened to such a level that sufficient material is available so that the desired contour can be achieved during machining and still enough residual material remains.

In FIG. 3, the sinusoidal contour 11 including the radial folds 13 becomes clear. Also, the machined shoulders 22 at the base of each radial fold 13 are evident.

If a cross section is taken through the cover 8 in the region of the inner and outer bearing seats 6 and 7 when the anti-friction bearings 9 and 10 are mounted, the situation shown in FIG. 4 arises. In the present case, the inner and outer anti-friction bearings 9 and 10 are ball bearings. The inner ring of the outer anti-friction bearing 10 is referenced with the reference number 25. An outer ring of the inner anti-friction bearing 9 is referenced with the reference number 26.

Figure 5:
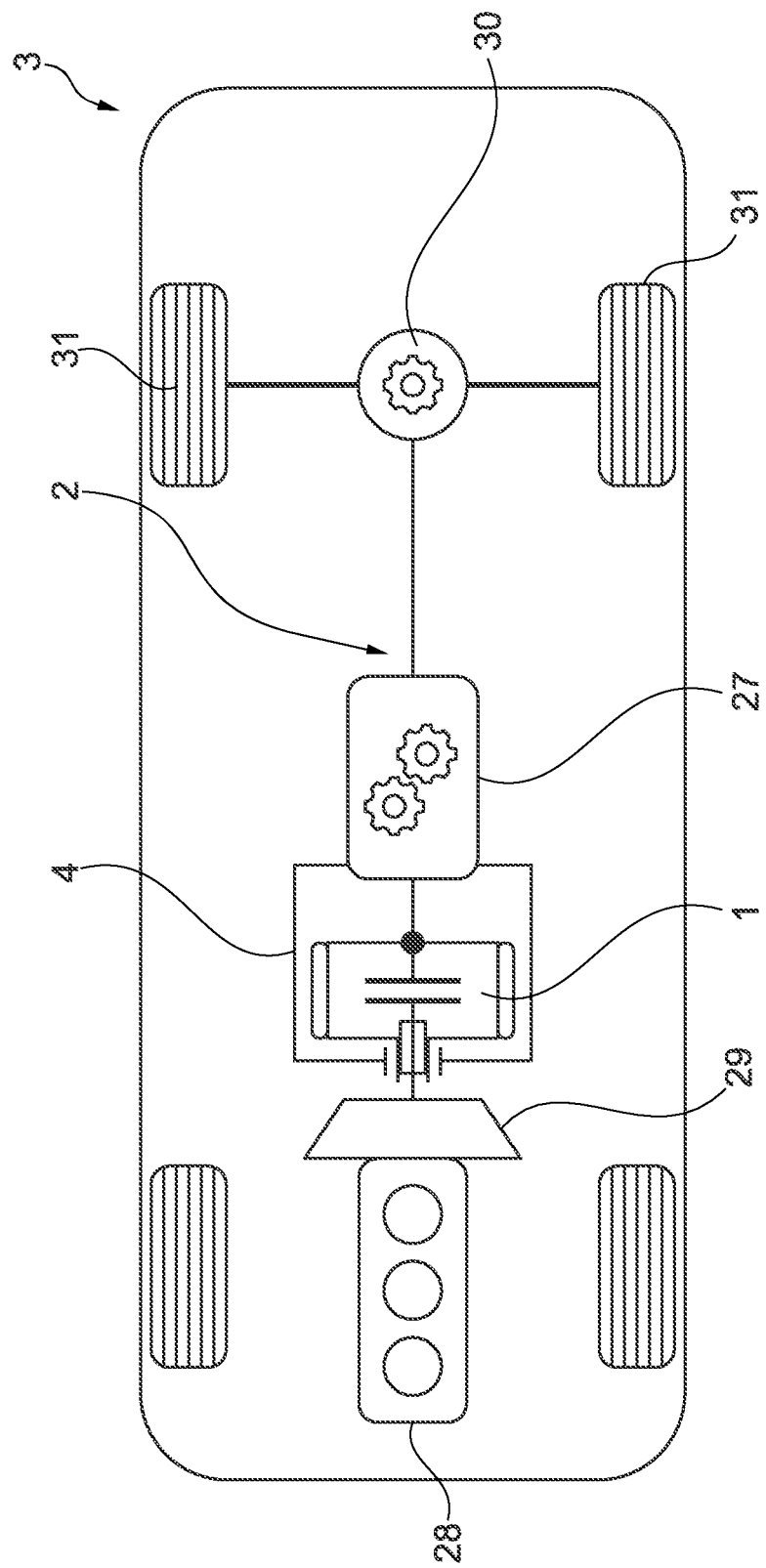
FIG. 5 shows the construction of a drive train of a motor vehicle with the friction clutch inserted according to FIG. 1.

A general overview is finally shown in FIG. 5, with the drive train 2 of the motor vehicle 3 also having a hybrid module 27. Furthermore, an internal combustion engine 28 is coupled to a flywheel 29 in order ultimately to selectively transmit torque via a friction clutch to the hybrid module and then via a transmission 30 to two drive wheels 31.

REFERENCE NUMERALS

1 Friction clutch
2 Drive train
3 Motor vehicle
4 Transmission housing
5 Shaft
6 Inner bearing seat
7 Outer bearing seat
8 Cover
9 Inner anti-friction bearing
10 Outer anti-friction bearing
11 Contour with folds
12 Axis of rotation
13 Radial fold
14 Groove
15 Securing ring
16 Axial direction
17 Radial direction
18 Counterplate
19 Pressure plate
20 Clutch disc
21 Removed material/disposal material
22 Shoulder
23 Axial fold
24 Sheet metal thickness
25 Inner ring of the outer anti-friction bearing
26 Outer ring of the inner anti-friction bearing
27 Hybrid module
28 Internal combustion engine
29 Flywheel
30 Transmission
31 Drive wheel

The invention claimed is:

1. A friction clutch for a drive train of a motor vehicle, with a cover which, in order to be mounted in a transmission housing or in order to mount a shaft, has an inner bearing seat or an outer bearing seat for respective receiving of an anti-friction bearing, wherein the cover is a sheet metal component having a contour with folds in the region of the inner bearing seat or the outer bearing seat and the contour with folds is machined on its inside to form the inner bearing seat and on its outside to form the outer bearing seat.

2. The friction clutch according to claim 1, wherein the cover comprises radial folds in the inner bearing seat or the outer bearing seat.

3. The friction clutch according to claim 2, wherein the radial folds are selected to be so thick and lie so close together that, for machining of the inner bearing seat or the outer bearing seat, when material is removed, sufficient residual material remains for a desired stability.

4. The friction clutch according to claim 2, further comprising a groove for receiving a securing ring introduced into the folds.

5. The friction clutch according to claim 1, wherein the contour runs sinusoidally in a circumferential direction.

6. The friction clutch according to claim 1, wherein the cover has axial folds on a surface that is oriented perpendicular to an axis of rotation of the cover.

7. The friction clutch according to claim 6, wherein a groove for a securing ring assigned to an inner bearing is further away from a region with axial folds than a groove for a securing ring assigned to an outer bearing.

8. A transmission arrangement with a transmission housing in which the friction clutch according to claim 1 is supported via an anti-friction bearing and an input shaft is mounted via a further anti-friction bearing in the cover of the friction clutch.

9. A friction clutch for a drive train of a motor vehicle comprising a cover, the cover being a deep drawn sheet metal component comprising:
a contour comprising folds forming:
an inner bearing seat for receiving an inner anti-friction bearing for mounting a shaft; or
an outer bearing seat for receiving an outer anti-friction bearing for mounting the friction clutch in a transmission housing; and
axial folds on a surface oriented perpendicular to an axis of rotation of the cover.

10. The friction clutch of claim 9 wherein the folds comprise radial folds.

11. The friction clutch of claim 9 wherein the contour is sinusoidal in a circumferential direction.

12. The friction clutch of claim 11 wherein the radial folds are sufficiently thick to maintain a desired stability after material is removed during machining of the inner bearing seat or the outer bearing seat.

13. The friction clutch of claim 11 wherein the contour further comprises a groove for receiving a securing ring disposed in the folds.

14. The friction clutch of claim 9 wherein:
the contour is machined on its inside to form the inner bearing seat; or
the contour is machined on its outside to form the outer bearing seat.

15. The friction clutch of claim 9 wherein the cover further comprises:
a groove for an inner bearing securing ring disposed at a first distance from the axial folds; and
a groove for an outer bearing securing ring disposed at a second distance, less than the first distance, from the axial folds.

* * * * *